US00RE34386E

United States Patent [19]

Davidson et al.

[11] E Patent Number: Re. 34,386

[45] Reissued Date of Patent: Sep. 21, 1993

[54] IMPELLER

[75] Inventors: John F. Davidson, Cambridge; Keshavan Niranjan, Reading, both of United Kingdom; Aniruddha B. Pandit, Bombay, India

[73] Assignee: National Research Development Corporation, London, England

[21] Appl. No.: 651,289

[22] Filed: Jan. 25, 1991

Related U.S. Patent Documents

Reissue of:

[64] Patent No.: 4,799,862
Issued: Jan. 24, 1989
Appl. No.: 73,823
Filed: Jul. 15, 1987

[30] Foreign Application Priority Data

Jul. 18, 1986 [GB] United Kingdom ..... 8617569

[51] Int. Cl.[5] ..... B01F 5/10

[52] U.S. Cl. ..... 416/242; 366/330; 366/343; 416/243

[58] Field of Search ..... 416/223 R, 242, 243, 416/238, DIG. 2; 366/330, 343

[56] References Cited

U.S. PATENT DOCUMENTS

| | | | |
|---|---|---|---|
| 2,347,195 | 4/1944 | Huff | 366/330 X |
| 2,590,581 | 3/1952 | Shirley | 366/330 X |
| 2,716,545 | 8/1955 | Dorrough | 416/242 X |
| 2,978,233 | 4/1961 | Davey | 416/228 X |
| 3,051,072 | 8/1962 | Bohanon | 416/243 X |
| 3,174,313 | 3/1965 | Crosby | 336/330 X |
| 4,468,130 | 8/1984 | Weetman | 416/243 X |
| 4,571,090 | 2/1986 | Weetman | 366/343 X |

FOREIGN PATENT DOCUMENTS

| | | | |
|---|---|---|---|
| 568738 | 1/1959 | Canada | 366/330 |
| 007396 | 5/1983 | European Pat. Off. . | |
| 2803407 | 8/1979 | Fed. Rep. of Germany | 366/343 |
| 806764 | 12/1958 | United Kingdom . | |
| 1107762 | 3/1968 | United Kingdom . | |
| 1263165 | 2/1972 | United Kingdom . | |
| 1528399 | 10/1978 | United Kingdom . | |
| 2157185 | 10/1985 | United Kingdom . | |

*Primary Examiner*—Edward K. Look
*Assistant Examiner*—Therese M. Newholm
*Attorney, Agent, or Firm*—Cushman, Darby & Cushman

[57] ABSTRACT

A rotating impeller for stirring liquids contained in tanks. Strip-like blades of simple form radiate from a central hub, in swept-back configuration relative to the direction of rotation. The blades are angled relative to the hub so as to exert a forward and downward force upon the liquid as the impeller rotates, and the blade curvature is such that the area projected upon the liquid by the solid structure of the rotating blade is less than the corresponding area that would be projected by an otherwise similar blade in which imaginary straight lines connected all adjacent vertices, and any void areas lying within the boundaries of those imaginary lines had been filled in. The preferred arrangement of the blades is such that when the impeller is arranged with its axis vertical, curvature of each blade along its length is such that it extends away from the hub in a diminishing downward curve, reaches a lowest point, and then rises again before the blade tip is reached. In cross-section each blade will typically be straight and parallel-sided, but may also be slightly curved, of aerofoil section, etc.

9 Claims, 6 Drawing Sheets

Fig. 3
(PRIOR ART)
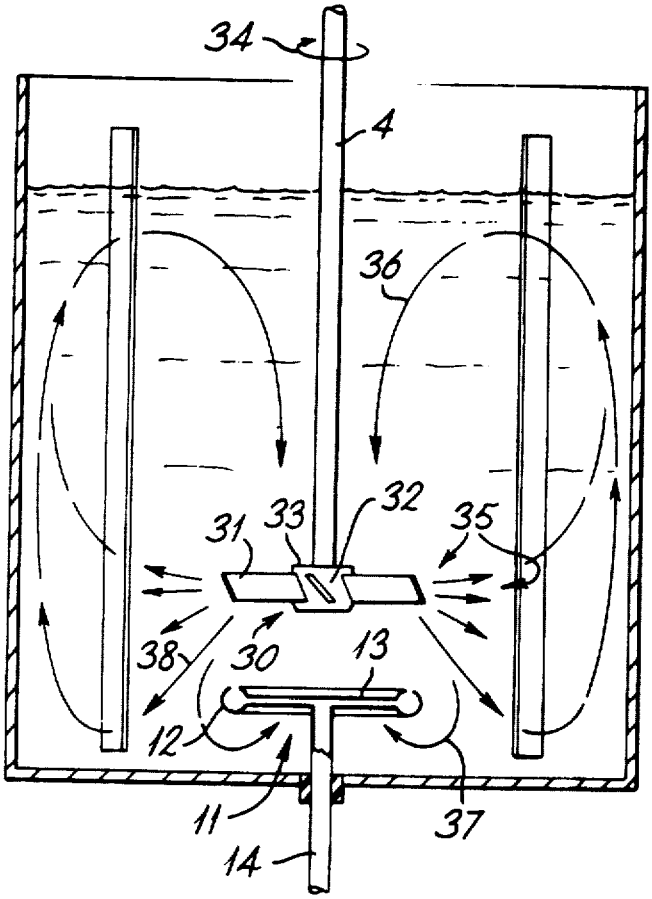
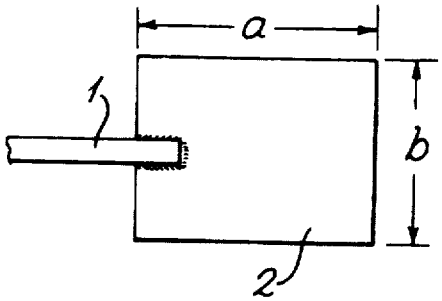
Fig. 4
(PRIOR ART)
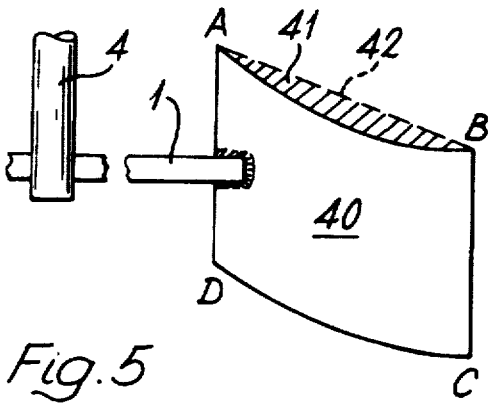
Fig. 5
(PRIOR ART)

IMPELLER

Matter enclosed in heavy brackets [ ] appears in the original patent but forms no part of this reissue specification; matter printed in italics indicates the additions made by reissue.

This invention relates to rotatable impellers for stirring liquids contained in tanks, and to mixing apparatus comprising tanks fitted with such impellers. In typical industrial applications, liquid to be stirred is contained in a cylindrical tank arranged with its axis vertical, and the depth of the liquid is of the same order as the diameter of the tank. Stirring is effected by rotating impeller immersed in the liquid, and mounted on a shaft co-axial with the tank. Typically the stirring takes place for one or both of two reasons. Firstly, the liquid may contain particles, which it is necessary to suspend and distribute homogeneously throughout the liquid. Secondly, air or other gas may be blown into the liquid, for instance through a perforated tube which is typically immersed in the liquid on the tube axis below the impeller, and it is necessary to achieve good dispersion of the gas within the liquid. The undesirable effect of gross rotation of the liquid within the tank by the rotating impeller is often inhibited by vertical baffles mounted at equal angular intevals around the inner surface of the cylindrical wall of the tank.

Three impellers, each now regularly in use for the commercial stirring of liquids, are illustrated in FIGS. 1A and 1B to 3 of the accompanying diagrammatic drawings. Each such FIG. shows a tank and the respective impeller in diagrammatic axial section, and FIGS. 1A, 1B and 2A, 2B also include a further underneath plan view of the impeller along. The axial section gives an impression of the flow patterns that are set up when the impeller is mounted at the bottom end of a vertical shaft and rotated within a body of liquid contained in a cylindrical vessel.

FIG. 1 shows the kind of impeller usually known as a "disk turbine" or "Rushton impeller", comprising a circular disk 1 with six paddles 2 mounted at equal spacing around the periphery 3. Each paddle 2 is a plane rectangular metal sheet coplanar with the axis of the shaft 4 on which the disk is mounted, and extending both above and below the disks. In operation the dominant centrifugal action of the rotating paddles 2 throws the liquid out radially, generating the two circulation loops 5 and 6 within the liquid contained within a cylindrical vessel 7. The latter has a circular base 8 and a side wall 9, and vertical baffles 10 are mounted on the inner surface of the wall to inhibit gross rotation of the liquid by the impeller. Where the liquid contains particles, it is a drawback of this type of impeller that particle pick-up from close to the base 8 of the vessel is poor, because the circulation velocity in loop 6 close to the base is low. Also when gas is injected into the liquid, for instance through a sparging head 11 comprising a perforated ring 12 connected by radial feed conduits 13 to a vertical inlet pipe 14, the gas bubbles tend to enter the eye of the impeller because of both their buoyancy and the action of circulation loop 6; this gas then tends to form a gas cavity behind each paddle 2, so reducing the power transmitted to the liquid by that paddle. More generally, when any liquid is stirred by such a paddle intense local turbulence will be generated around the tips of the paddles in the region indicated by reference 15; this turbulence has the disadvantage of dissipating much of the input power. This disadvantage can be diminished by mounting the plane paddles 2 in sweep-back fashion as at 2a, so that they lie at an acute angle to the tangent 16 to the periphery 3 instead of at right-angles.

The second form of known stirring impeller illustrated in FIG. 112A, 2B is a standard marine propeller 20, with the typical complement of three blades 21. The blades are of complex but well-known shape, designed to exert a screw action upon the liquid and to accelerate it in a downward direction, parallel to the axis of shaft 4. A single circulation loop 22 is therefore set up within the liquid, and high velocity in the lower part 23 of the loop between the impeller 20 and the base 8 promotes good particle pick-up where particles are present in the liquid. However, if gas is being introduced through sparging head 11, that gas tends to bypass much of the liquid because the strong loop 22 carries the bubbles both outwardly towards the wall 9, and then up that wall between baffles 10 and straight to the surface 24 of the liquid, because the circulation in the top part 25 of loop 22 is relatively weak so that bubbles tend to break the surface rather than remain within the loop 22.

In the pitched-bladed impeller 30 of FIG. 3, six plane strip-like blades 31 are mounted at equal angular intervals around the rim 32 of a rotor 33, from which they each extend radially outwards. The line along which the root of each blade is attached to the rim is inclined to the vertical, so that as the shaft 4 rotates in the direction of arrow 34 the forward face of each blade 31 is angled downwards. In operation the illustrated flow pattern therefore results; some turbulence in region 35, as in region 15 in FIG. 1, and two circulation loops 36 and 37 with a particularly vigorous downward and outward motion 38 at the start of loop 37, due to the angling of blades 31.

The present invention arises from the search for an impeller comparably simple in construction with those of FIGS. 1 and 3 but with improved performance in general, and in particular with less tendency to generate excessive turbulence immediately outboard of the tips of the blades of paddles, and with reduced energy requirement in order to achieve a pre-determined standard of mixing. In the course of the search, one factor that has become seen to be of significance is the effective area that is "swept" through the liquid by each blade or paddle as the impeller rotates. FIG. 4 is a diagrammatic radial section through one of the paddles 2 of the impeller of FIG. 1. Because the paddle is plane and rectangular, the area which it sweeps through the liquid as the impeller spins is simple the area ($a \times b$) of the paddle itself. If the paddle does not lie at right-angles to the local tangent but is inclined to it, as at 2a in FIG. 1, the area which it sweeps is diminished, by multiplying the same paddle area ($a \times b$) by the sine of the angle of the inclination. However, we have appreciated that if the blade has at least one curved side, either by being so formed or by being bent after formation or both, what is in effect an enhancement of the swept area can be obtained. In FIG. 5 the plane rectangular paddle 2 of FIG. 4 is replaced by a plane paddle 40 having four vertices A, B, C, D and fixed to disk 1 so as to be coplanar with the axis of shaft 4. Opposite sides AD and BC are straight and vertical while the other two opposite sides AB and CD are curved and parallel. The area actually sept by paddle 40 as disk 1 rotates is therefore the area of the four-sides plate ABCD itself, and will be referred to a the actual swept area. However, we have found that while the power required to drive an impeller with such paddles tends to be related to the actual swept area, the degree of mixing achieved tends to reflect the sum of that actual area and any further area that can be enclosed by joining adjacent vertices by a straight line instead of by the curved side of the solid figure. In FIG. 5, such a further area (shown shaded) is indicated by reference 41 and is of segmental shape, being bounded on one side by the curved side AB of the solid plate and on the other by the imaginary straight line 42 joining vertices A and B. In the following text, the sum of the actual swept area (in FIG. 5, the area of the four-sided plate ABCD) and such a further area (in FIG. 5, the shaded area 41) will be referred to as the total swept area. It will thus be apparent that the actual swept area represents the actual area projected upon the fluid by the solid structure of a rotating blade, while the total swept area represents the area projected by an otherwise similar blade in which imaginary lines connect all adjacent vertices, and any void area lying within the boundaries of those lines have been filled in.

According to the present invention an impeller comprises a plurality of blades or paddles radiating symmetrically from a rotatable hub, in which each blade is of elongated form and is curved along its length, one end of the length being attached to the hub and the other constituting the blade tip; in which the curvature of the blades gives them a swept-back configuration relative to the direction of rotation of the impeller; and in which the total swept area, swept by each blade, exceeds the actual swept area.

Each blade may be bent in a continuous curve along its length. Such curvature may be uniform throughout the length.

The two opposite long edges of the blade may be parallel, and may be either straight or curved.

Each blade may be attached to the hub along a line inclined to a plane which intersects the axis of rotation of the hub at right-angles, the arrangement being such that if the impeller is rotated about a vertical axis the blades exert a forward and downward force upon liquid within which the impeller is rotated.

The arrangement of the blades may be such that when the impeller is arranged with its axis of rotation vertical, and is viewed in elevation, the curvature of each blade along its length is such that it extends away from the hub in a diminishing downward curve, reaches a lowest point, and then rises again to some extent, preferably to the same extent, before the top is reached.

The blades may contain further curvatures. For instance a blade may be twisted to some extent along its length, in the manner of a marine propeller. A blade may also be slightly curved, rather than straight, over its depth dimension: in use, some degree of hydrofoil effect may be set up by the reaction of such a blade with the fluid around it. The blades may be formed from sheet-form material and so be of uniform thickness throughout, but the invention also includes impellers with blades formed from material of non-uniform thickness, for instance material of a shallow aerofoil shape when the depth dimension is viewed in cross-section. The criterion should however be that the maximum thickness of the blade is very small compared with the depth, which in turn is small compared with the length.

The invention will now be described, by way of example with reference to the following further figures of drawings in which:

FIGS. 1A, 1B, 2A, 2B and 3-5 are illustrations of prior are mixing impeller;

Figure 1A:
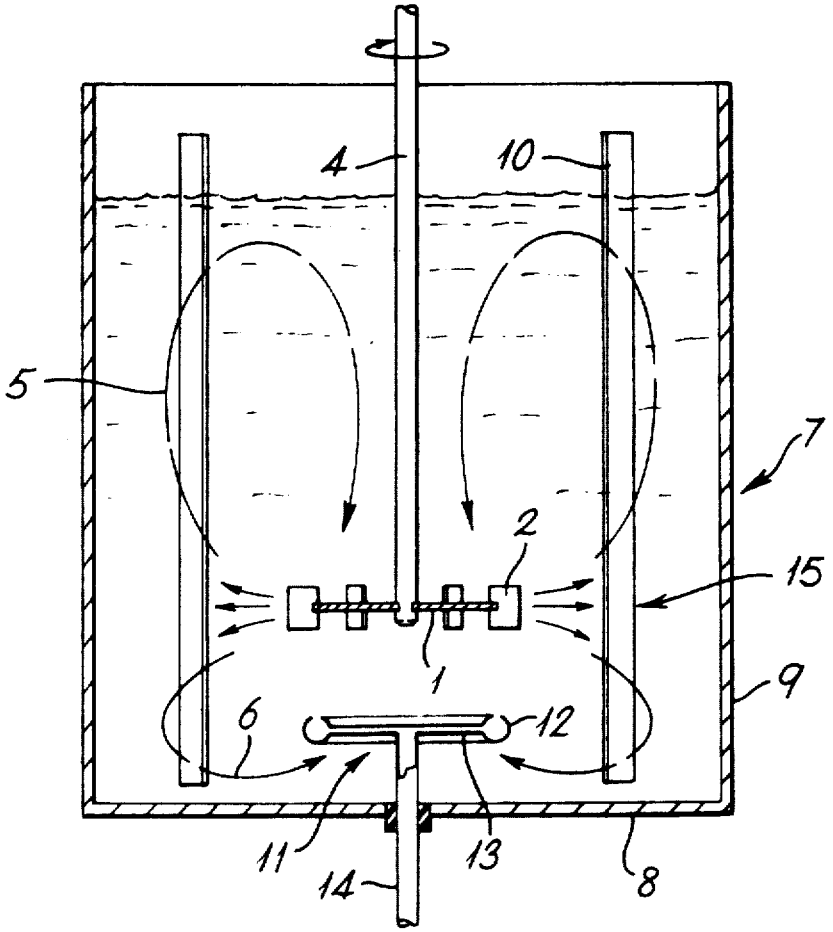
Fig. 1A. (PRIOR ART)

The impeller 49 of FIGS. 6 to 10 comprise six blades 50 extending outwardly at sixty-degree intervals from a hub 51. A central hole 52 in the hub receives shaft 4 to which the hub will be fixed by screw means shown diagrammatically at 53 in FIG. 6, and by which the impeller will be rotated in the direction of arrow 54 in the same way as the known impellers shown in FIGS. 1 to 3 and already described.

Figure 6:
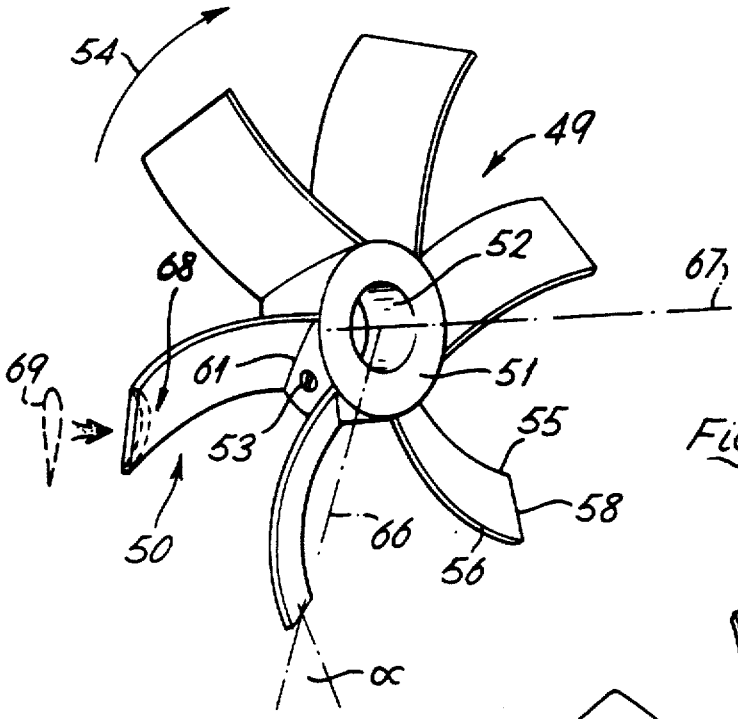
FIG. 6 is a perspective view of an impeller rotated about a vertical axis taken from above.
Figure 7:
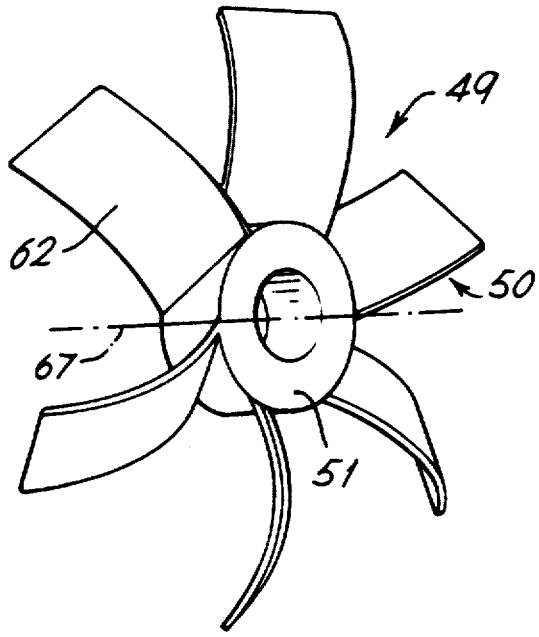
FIG. 7 is another perspective view, but from underneath.
Figure 8:
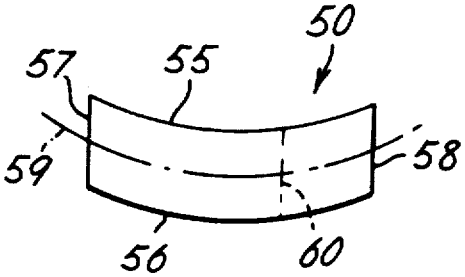
FIG. 8 is a plan view of one from of blade, when first cut from flat material.
Figure 9:
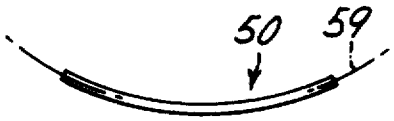
FIG. 9 shows the same blade in elevation, when ready for attachment to the hub after bending about its long axis.

Each blade 50 is first stamped as a blank from flat metal sheet, to the four-sided shape shown in FIG. 8. Of the two pairs of opposite and parallel sides of this four-sided figure, one pair (55,56) are long and curved and the other pair (57,58) are short and straight. The imaginary line 59 will be referred to as the long axis of the blank, and the imaginary line 60 as one of the transverse axes—that is to say the axes related to the depth dimension of the blade—and because axis 59 is long compared with axis 60 the blank may be described as being elongated in shape. To convert it to the form required of one of the blades 50, the blank is bent along its long axis 59 as shown in FIG. 9. The short end 57 of the blade is the end welded, slotted or otherwise attached to the hub so that the locus of the meeting of the hub and blade is a line 61 (see FIGS. 6 and 10) which is slanted to the vertical so that the forward face 62 of each blade (examples of which are best seen in FIG. 7) is angled downwardly at about 45 degrees to the vertical. Because line 61 is necessarily curved, the short side 57 of the blank must be course be reshaped into a corresponding curve before the blade is actually fixed to the hub. Because the illustrated blades 50 are stamped from flat sheet and formed as described, the transverse axes 60 will be straight. However, the blades could as one alternative be slightly curved over their depth dimensions as indicated in outline at 68 in FIG. 6, giving rise to some degree of "hydrofoil" action as each blade moves through the surrounding fluid in use. As another alternative the invention includes not only blades of uniform thickness but also thin blades of non-uniform section, for instance the foil section indicated in outline at 69.

Figure 10:
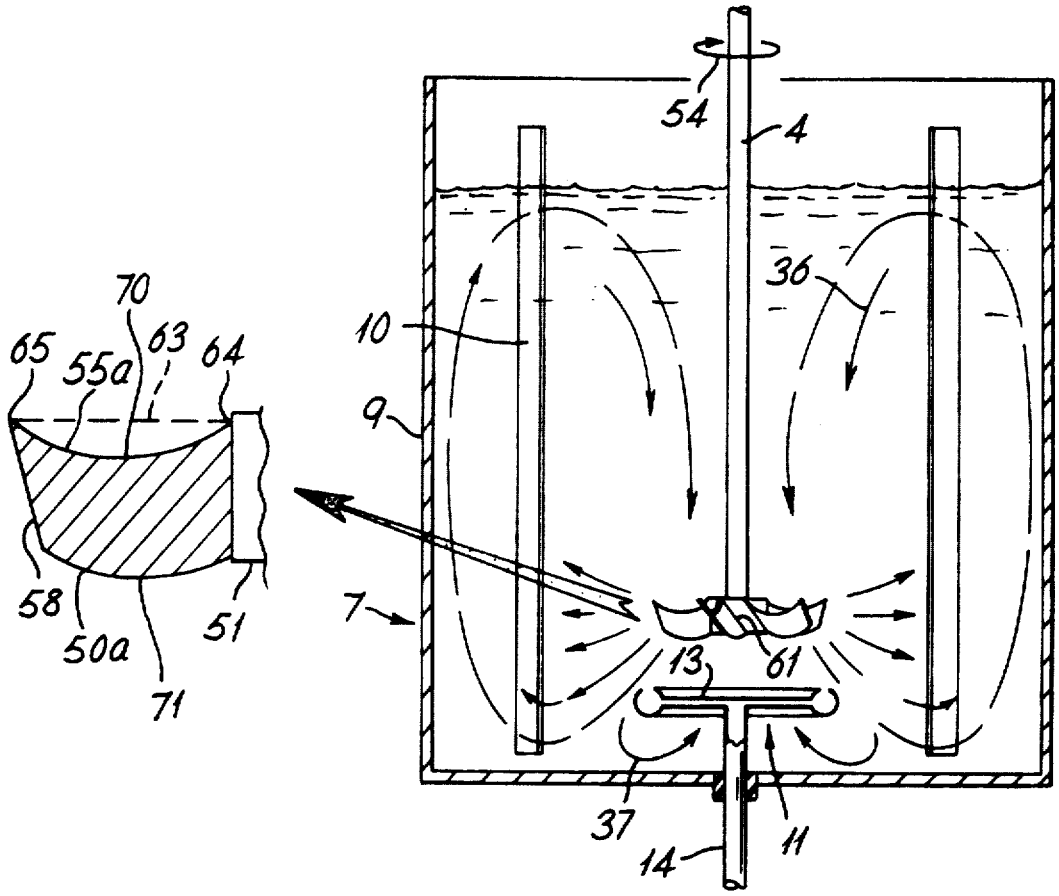
FIG. 10 is a diagrammatic view of the impeller in vertical elevation, and includes a part similar to the second parts of FIGS. 1 to 3, diagrammatically illustrating the flow pattern set up in use by an impeller as shown in FIGS. 6 to 9.

FIG. 10 shows best the relationship between the total and actual swept areas which are swept by the blades 50. In the enlarged detail of the FIG., showing the blade (50a) lying most nearly at right-angles to the direction from which the view is taken, it is clear that the actual swept area, represented by the structure of the blade itself which is shown shaded, is less than the total swept area which includes also the area above the top edge 55a of the blade but below the imaginary line 63 joining vertices 64 and 65 which preferably (and as shown) lie in the same horizontal plane. From this FIG. it is also apparent that due to the curvature of long axis 59 of the blade, and the angling of the line 61 along which the root of the blade is attached to the hub 51, each blade slopes downwardly away from its attachment to the hub 51 but reaches a lowest level (70, 71) and is rising again as the blade tip (short side 58) is approached. It will be noted that with such geometry the centre of gravity of the blade lies higher, and thus closer to the level of the root line 61, than would be the case if the blade sloped downwards continuously from root to tip, and thus promotes better mechanical balance and strength.

Figure 1B:
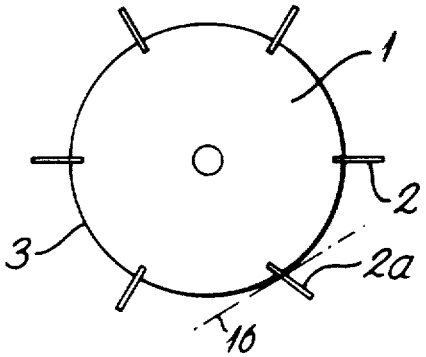
Figure 2A:
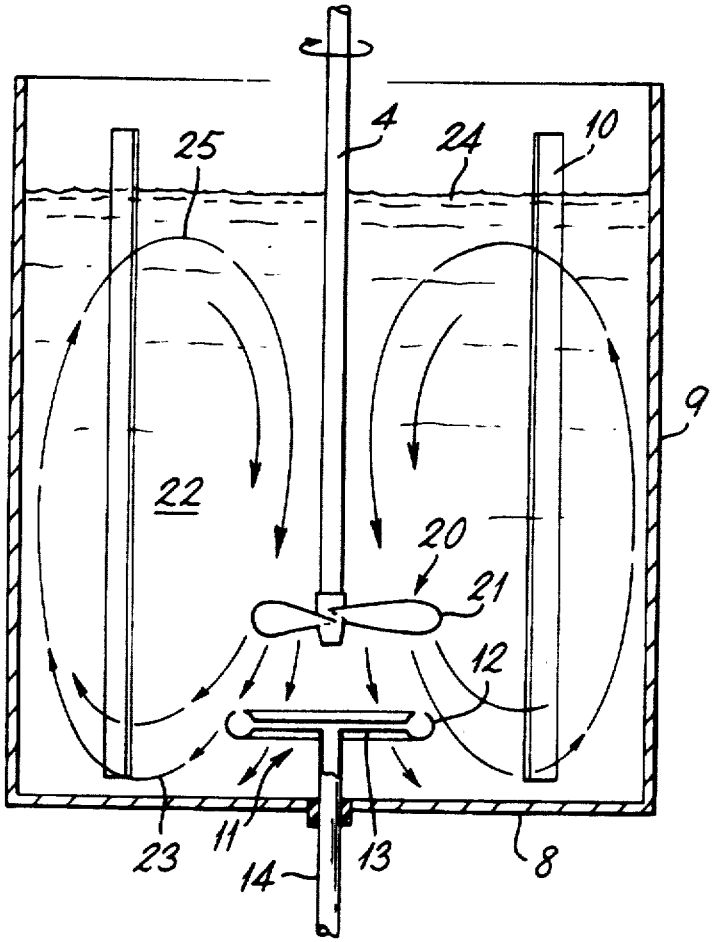
Fig. 2A. (PRIOR ART)
Figure 2B:
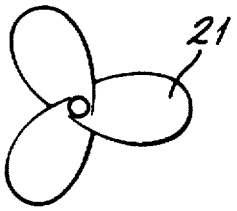

FIG. 10 also indicates the typical flow pattern which an impeller according to the invention sets up in use. Like the pitched-bladed impeller 30 of FIG. 3, impeller 49 sets up two strong and beneficial circulation loops 36 and 37. However, the curvature of each blade along its long axis 59 results in each blade being swept back in relation to the direction of rotation of the impeller which is indicated by arrow 54. In the case of the impeller actually illustrated in FIGS. 6 to 10, the extent of the sweepback is such that at the tip 58 of each blade the long axis 59 makes an angle $\alpha$ of about forty-five degrees to the radial line 66 joining that tip to the axis of shaft 4, as is best shown in FIG. 6. This sweepback has an advantage comparable to that of the alternative, angles arrangement of paddle (2a) in FIG. 1, namely that the reaction of the paddle against the fluid imparts to that fluid an element of motion that is not aligned with the motion of the blade itself, so reducing the absolute velocity relative to the container that is imparted to the fluid. This reduction of the absolute velocity reduces the dissipation of energy near the impeller—that is to say the energy wasted in regions 15 and 35 in FIGS. 1 and 3—so that more of the input power goes into the loops 36, 37 thus giving better mixing. In general the impeller illustrated in FIGS. 6 to 10 generates a combination of downward and radial motion appropriate for mixing. When gas is introduced to the vessel 7 of FIG. 10, for instance by sparge pipe 11 as before, the turbulent wake which formed behind each paddle or blade of the known impellers of FIGS. 1 and 3 is largely avoided; the shape and mounting of the blades of the impeller according to the invention promotes a smooth flow pattern over each blade so that when gas is injected below the impeller that is less tendency to form gas cavities behind the impeller blades. Compared with the ship's propeller shown in FIG. 2A, 2B, the impeller of FIGS. 6 to 10 has the potential advantages of better bubble distribution when gas is injected, due to greater radial liquid velocities in lops 36 and 37, and better particle distribution due to the combination of better upward liquid velocities near to the base of the tank, and higher radial velocities in the upper part of the tank at the crest of loop 36.

An experiment was performed to compare the blending efficiency of an impeller according to the invention, as shown in FIGS. 6 to 10, with that of the three known impellers shown in FIGS. 1 to 3 and also the modified version of FIGS. 1 in which the paddles (2a) are swept back at forty-five degrees. The following dimensions were common to all five experiments:

tank diameter: 0.3 m
liquid depth: 0.3 m
impeller diameter (D): 0.1 m
height of impeller above bottom of tank: 0.1 m gross rotation of the fluid within the tank was inhibited by four vertical baffles 10, each of height 0.3 m and width 0.1 m, equally spaced around the inner face of the cylindrical side wall 9. In the experiments a tracer was injected into the liquid and the concentration of the tracer was measured as a function of time at a fixed point int he liquid. If stirring is continued indefinitely, ultimately the concentration reaches a steady value c when mixing is complete. A mixing time $N_\theta$ is defined as the time taken to reach a concentration within the range 1.05 c to 0-.95 c, i.e. a concentration when c varies from its ultimate value by no more than 5%. $N_\theta$ is found to be constant for a given impeller/ vessel combination, and its value is a measure of the effectiveness of the impeller, small values being better than large. The following table records not only $N_\theta$, and the energy (in Joules) expended in 10 seconds of operation using each impeller, but also the power number $N_p = P/\rho N^3 D^5$, P being the power to drive the impeller, $\rho$ the liquid density and N the speed of rotation. For high values of Reynolds number $ND^2/\mu$, $\mu$ being the liquid viscosity, the power number is constant. A low value of power number is desirable to minimise driving power.

| | mixing time ($N_\theta$) | Power Number ($N_p$) | Energy in Joules required for 10 seconds mixing |
|---|---|---|---|
| 1. Impeller of FIG. 1 with 6 radial paddles as shown at 2. | 42 | 5.5 | 33.22 |
| 2. Impeller of FIG. 1, with 6 swept-back paddles as shown at 2a. | 38.6 | 2.6 | 14.95 |
| 3. Marine propeller (3 blades) as shown in FIG. 2. | 52.6 | 0.80 | 11.65 |
| 4. Pitch-bladed impeller (6 blades) as shown in FIG. 3. | 41.2 | 1.2 | 8.38 |
| 5. Impeller according to the invention (6 blades) as shown in FIGS. 6 to 10. | 33.5 | 1.16 | 4.16 |

The point at which tracer was introduced, the volume and concentration of the tracer and other relevant parameters were the same in all the experiments which gave rise to the results tabulated above: the type of impeller used was the only apparently significant variable. In these experiments the impeller according to the invention thus gave the best reading for mixing time, by far the best reading for energy consumption, and came a close second to the marine propeller of FIG. 2A, 2B on power number.

Figure 11:
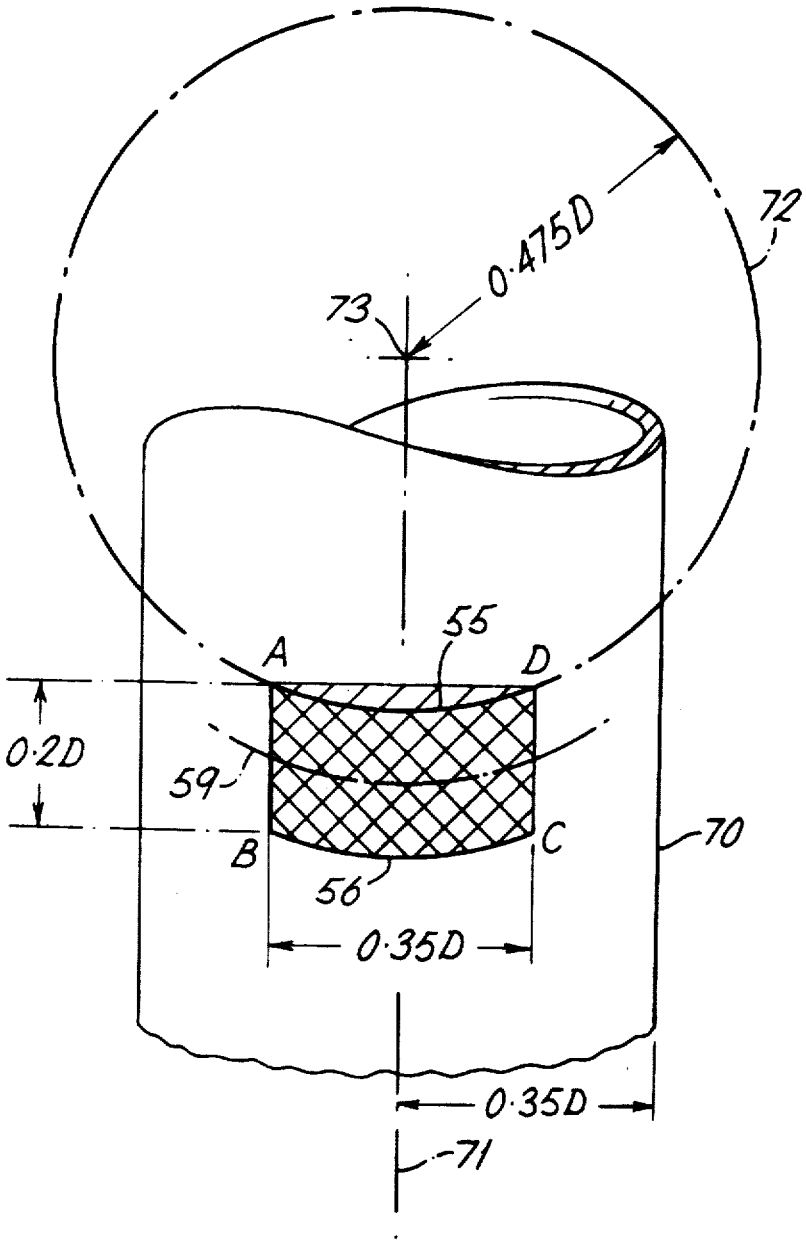
FIG. 11 is an alternative diagrammatic illustration of how the shape of the blade of FIGS. 8 and 9 may be determined.

FIG. 11 illustrates the form of a blade as so far described by imagining it to be cut from a sheet metal tube 70 of diameter 0.7D, D being as before the diameter of the impeller. The blade is generated by cutting out a piece of the tube wall, double hatched in FIG. 11. The boundary of the blade is as before defined by the four lines AB, BC, CD and DA. AB and CD are straight lines AB, BC, CD and DA. AB and CD are straight lines parallel to the axis 71 of the tube, and 0.35D apart. The curve AD is generated by the intersection of an imaginary cylinder 72 of radius 0.475D with the tube 70, the axis 73 of cylinder 72 being at right angles to axis 71. The curve BC is generated in the same way as the curve AD, but the intersecting cylinder 72 is displaced downwards, in the elevation be a distance of 0.2D. The curvature of the long axis 59 is of course now the curvature (radius 0.35D) of the wall of tube 70.

The effect on impeller performance of the curvatures just discussed will now be considered. The curvature of the long axis 59 of the blade is altered by increasing or decreasing the radius of tube 70 of FIG. 11, and affects angle α of FIG. 6. Reducing the radius increases α which reduces the strength of the circulation loops 36 and 37 in FIG. 10. Increasing the radius decreases α and leads to high swirl, i.e. rotation of the liquid around the axis of the impeller in its direction of rotation: such swirl dissipates energy by impact on the baffles 10 FIG. 1. A suitable compromise between the conflicting requirements of (i) strong circulation loops, and (ii) low swirl, is obtained by having α about 45°.

As to the curvatures of the long blade sides 55 and 56, the "total swept area" as described and illustrated earlier in this specification is also represented by the sum of the single hatched and double hatched areas in FIG. 11. When the blades are mounted on the hub, the liquid stirred by motion of the blades is proportional to the "total swept area" because liquid passing through the single hatched area subsequently passes over the blade near the corner D, D being at the outer periphery when the blade is mounted on the hub.

As already noted, mixing effect is approximately proportional to the total swept area, whereas the power is approximately proportional to the swept area, i.e. the double hatched are on FIG. 11. From this it follows that it is desirable to maximise the total swept area by increasing the curvatures 55 and 56, say be reducing the radius of intersecting cylinder 72 to 0.4D or 0.3D. However, if the curves AD and BC are too strongly curved, i.e. have too small a radius of curvature, this leads to an unsatisfactory design: the centre of gravity of the blades could be below the hub 51. Also the lowest point of curve BC will be much below the hub level, which will increase the circulation strength of the loop 37 and reduce the circulation strength of loop 36 of FIG. 10, adversely affecting the mixing performance. A suitable compromise is to choose the radius of curvature of blade sides 55 and 56 (AD and BC in FIG. 11) so that, when viewed from a point on the hub axis 67 (FIG. 6), those sides appear as approximately straight lines.

We claim:

1. An impeller comprising:

a hub, adapted to rotate in a predetermined direction about an axis of rotation;

a plurality of blades radiating symmetrically from said hub; each said blade being of elongated shape and having a longitudinal axis, the length dimension of said each blade having opposite first and second ends;

said first end of each said blade being attached to said hub, and said second end constituting the tip of each said blade;

each said blade being of substantially uniform cross-section throughout said length;

each blade extending from said hub in a direction wherein said longitudinal axis thereof extends at an angle to said axis of rotation of said hub;

in which said longitudinal axis is curved;

and in which each said blade is so disposed relative to said hub that said curved longitudinal axis results in said blade having a first and swept-back curvature relative to said predetermined direction of rotation of said hub and visible when said blade is viewed in a direction parallel to said axis of rotation, and a second curvature *along its length such that it extends away from said hub in a diminishing curve in one direction, reaches a first point, and then curves in an opposite direction before the tip is reached, said curvatures being* visible when said blade is viewed in a direction normal to a radius to said axis of rotation at the point where said blade radiates from said hub.

2. An impeller according to claim 1 in which each said blade is bent in a continuous curve along its said length.

3. An impeller according to claim 2 in which the curvature of the said continuous curve is uniform along said length.

4. An impeller according to claim 1 in which the said elongated shape of each said blade presents first and second opposite long edges of said shape each extending between said first and second ends, and in which said first and second opposite long edges are parallel and curved.

5. An impeller according to claim 1 in which the locus of said attachment of said first end of each said blade to said hub is substantially linear, said line being inclined to a plane intersecting the axis of said rotation of said hub at right angles, whereby if said impeller is rotated in said predetermined direction about a vertical axis said blades exert a forward and downward force upon any fluid which they contact.

[6. An impeller according to claim 1 in which the orientation of said blades is such that when said impeller is arranged with its axis of said rotation vertical, and is viewed in elevation, said curvature of each blade along its said length is such that said blade extends away from said hub in a diminishing downward curve, reaches a lowest point, and then rises again before said blade tip is reached.]

7. An impeller according to claim [6] *1* in which said blade tips, and the locus of attachment of said first ends of said blades to said hub, lie at substantially the same horizontal level when said impeller is so viewed.

8. An impeller according to claim 1 in which each said blade is twisted along its length, in the manner of a marine propeller.

9. An impeller according to claim 1 in which said cross-section of each said blade is arcuate.

10. An impeller according to claim 1 in which said cross-section of said blade is of aerofoil shape.

* * * * *